United States Patent [19]

Hanau et al.

[11] Patent Number: 4,827,434
[45] Date of Patent: May 2, 1989

[54] METHOD FOR TIME MODULATION IN VECTOR FILM RECORDERS

[75] Inventors: Paul R. Hanau, Portland, Oreg.; M. David Blythe, Colorado Springs, Colo.

[73] Assignee: Hewlett-Packard Company, Palo Alto, Calif.

[21] Appl. No.: 889,028

[22] Filed: Jul. 22, 1986

[51] Int. Cl.[4] .......................... G09G 1/28; H04N 5/84
[52] U.S. Cl. ................................... 364/526; 358/244; 358/332; 364/525; 340/703
[58] Field of Search ....................... 364/525, 526, 570; 346/107 R, 110 R, 708; 358/244, 332; 340/703, 720, 701

[56] References Cited

U.S. PATENT DOCUMENTS

| | | | |
|---|---|---|---|
| 4,473,849 | 9/1984 | Cool | 358/332 |
| 4,536,848 | 8/1985 | d'Entremont et al. | 364/526 |
| 4,575,766 | 3/1986 | Birnbaum et al. | 358/244 |
| 4,583,186 | 4/1986 | Davis et al. | 364/526 |
| 4,660,098 | 4/1987 | Wolcott | 358/244 |

OTHER PUBLICATIONS

Hasebe, Mason and Zamborelli, "A Fast, Compact, High-Quality Digital Display for Instrumentation Applications", Hewlett-Packard Journal, Jan. 1982, pp. 20 through 28.

Primary Examiner—Parshotam S. Lall
Assistant Examiner—Brian M. Mattson
Attorney, Agent, or Firm—Karl E. Bring

[57] ABSTRACT

Time modulation in a vector film recorder is used to control the color of an image to be recorded by using a constant intensity electron beam and controlling the number of electron beam sweeps for each primary color in a color filter wheel and for each vector in a set of vectors which when summed make up the image to be recorded.

1 Claim, 3 Drawing Sheets

METHOD FOR TIME MODULATION IN VECTOR FILM RECORDERS

BACKGROUND OF THE INVENTION

This invention concerns a method of exposing film in a vector film recorder while enabling efficient control of intensity, color, and line width. A copending application no. 889,035 entitled "METHOD FOR ENHANCEMENT OF DISPLAY SCREEN RESOLUTION" filed July 22, 1986, describes a related method of improving resolution.

Color film recorders are devices used to record electronic signals such as computer generated graphics on slide film, photographic film, or instant photographic film, and are often used as computer peripherals. An image to be film recorded is generated by a cathode ray tube (CRT) in a system closed with respect to light. The CRT in vector film recorders generates a series of lines drawn between endpoints to create an image. A color filter wheel, having filters for the three primary colors of light—red, green, and blue, controlled by a stepper motor filters the white light of the CRT to define the color for the image.

In some prior art film recorders, the amount of light reaching the film, and the subsequent exposure, was controlled by the intensity of the image generated by the CRT, which was dependent on the voltage of the electron beam used to generate the line. However, an increase in intensity also caused an increase in the width of the line generated on the CRT. Furthermore the relationship of the intensity to the voltage of the electron beam was not a linear function. Special hardware was also required to vary the intensity. These problems made it difficult to control the intensity, line width, and color of the image generated by the CRT and therefore difficult to control the quality of the recorded image.

SUMMARY OF THE INVENTION

In accordance with the illustrated preferred embodiment, the present invention provides for the improved control of the intensity, line width, and color of CRT-generated lines by sweeping a constant intensity electron beam across the screen a specified number of times for each filter of a color filter wheel The image to be generated is broken down into a set of vectors, single lines defined by endpoints which when superimposed on the film will create the image. The film exposure and color for each vector is controlled by the number of times the line is generated by the CRT. The color is defined by the use of a stepper motor and a color filter wheel having the three primary colors—red, green, and blue—to filter the white light of the CRT.

DESCRIPTION OF THE PREFERRED EMBODIMENT

Figure 1:
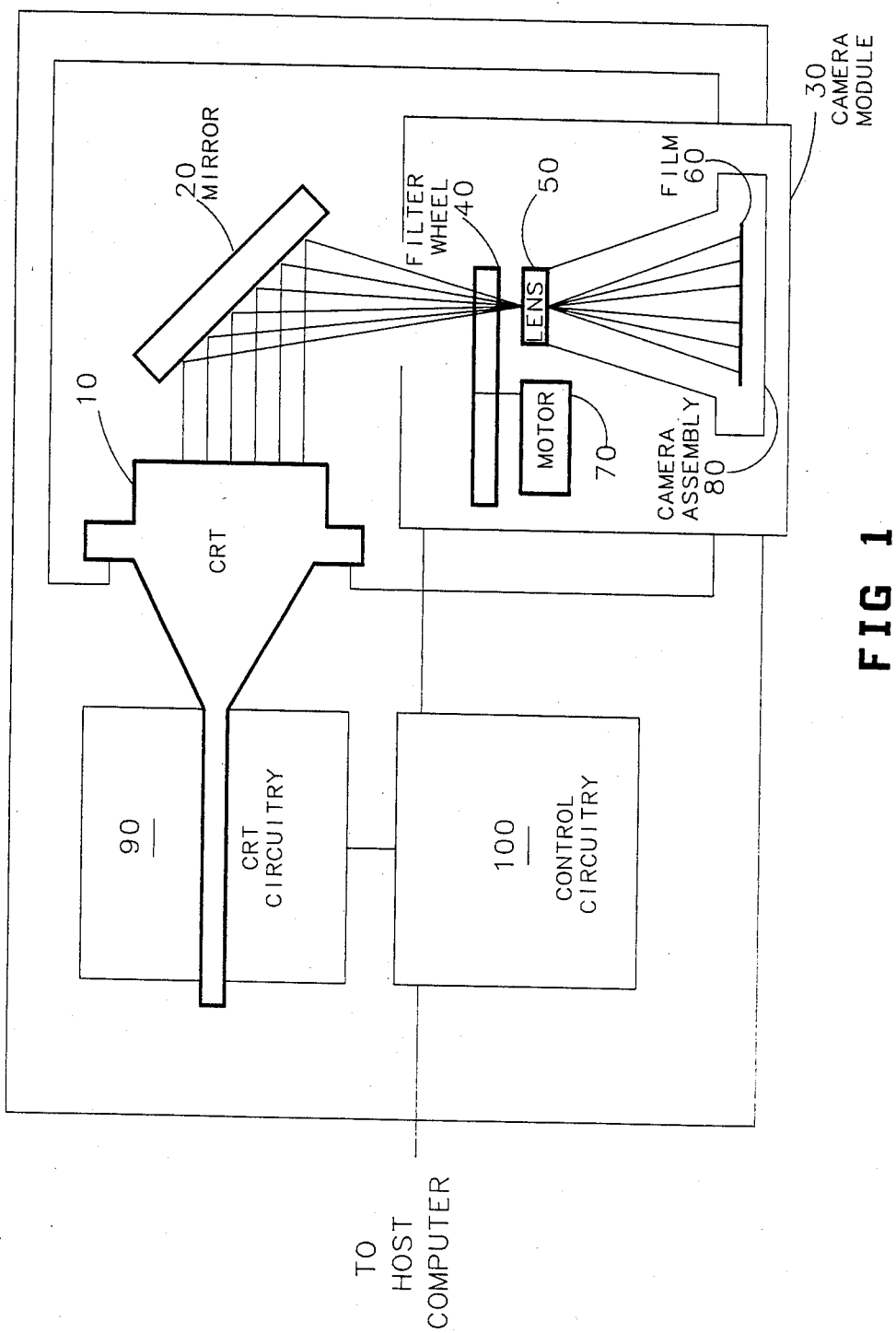
FIG. 1 shows a diagram of a vector film recorder using the preferred embodiment of the present invention.

FIG. 1 shows a vector film recorder according to the preferred embodiment of the present invention. An image is generated by a CRT 10, reflected by mirror 20, passed through a color filter wheel 40 and camera lens 50, and is recorded on film 60. Camera module 30 is removable and contains filter wheel 40, stepper motor 70, and camera assembly 80. The camera module is electronically connected to the film recorder to control the filter wheel 40 via stepper motor 70 and autowind features and camera module identification (information on the camera type). From the CRT 10 to the film 60 in camera module 30, the system is closed with respect to light. Consequently, the image generated on the film 60 will be dependent on the intensity of the CRT image and the length of time the image exists on CRT 10. The CRT 10 has a flat screen to facilitate sharp focusing.

Block 90 contains the deflectors and high voltage amplifiers required for normal operation of a cathode ray tube. Block 100 contains control circuitry for the film recorder, enabling communication and control between the CRT 10, the camera module 30 and a host computer. Typically, an image is created on the host computer. Then the host computer is responsible for converting the created image into a series of vectors, which consist of two endpoints for defining a line. This process of conversion is well known in the prior art and is used in film recorders and plotters. The CRT 10 will sweep an electron beam between the endpoints to expose the film. The set of all sweeps superimposed on a screen would replicate the created image. The colors for the image are determined by the user from the host computer The three primary colors are available on filter wheel 40. The chosen colors for each vector are produced by exposing the film to white light filtered through each primary color for appropriate times. For example a chosen color might require 6 sweeps with the red filter in position, 9 sweeps with the blue filter, and 2 sweeps with the green filter. The actual numbers for particular colors are film-dependent and must be determined through experimentation.

Ideally, the sweep speed should be constant and equivalant for all vectors to provide identical colors for both short and long vectors. This particular embodiment had a slower speed weep for shorter vectors and a faster speed sweep for longer vectors. Experimentation was used to derive a function to negate the effect of different speeds. The function provided a coeffecient based on vector length to be multiplied by the number of sweeps required for each primary color of a particular vector. This increased or decreased the number of sweeps required and neutralized the effect of the vector length.

Figure 2:
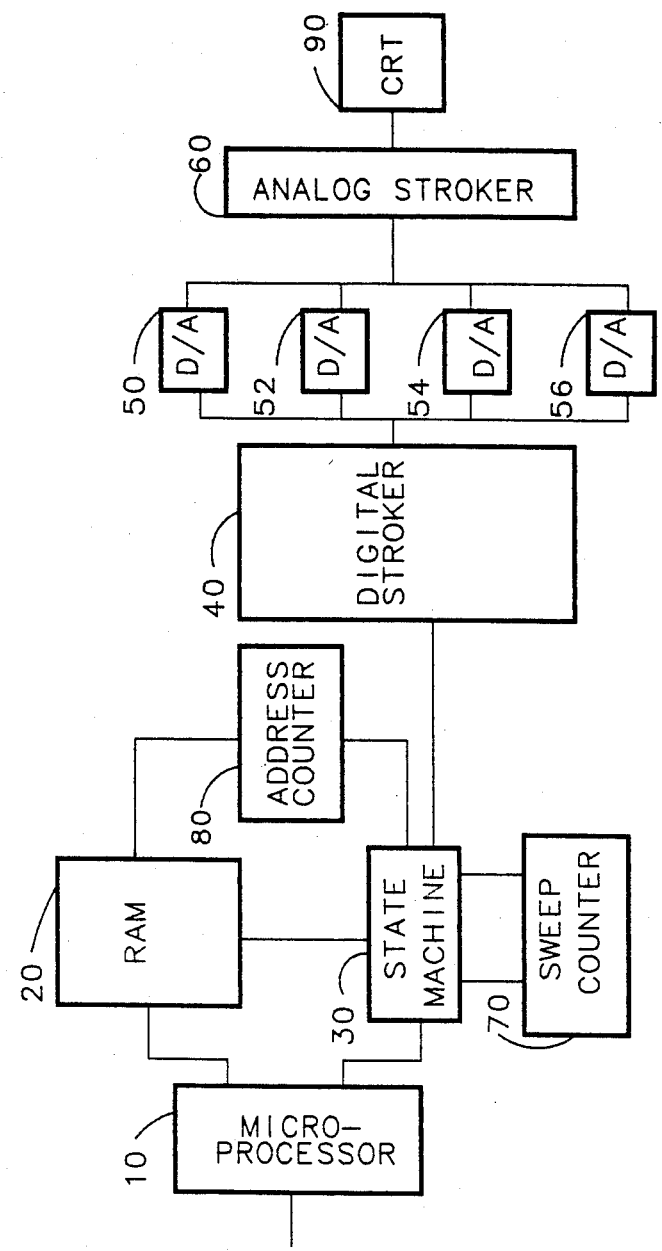
FIG. 2 shows a block diagram of the hardware used for time modulation in the preferred embodiment of the present invention.
Figure 3:
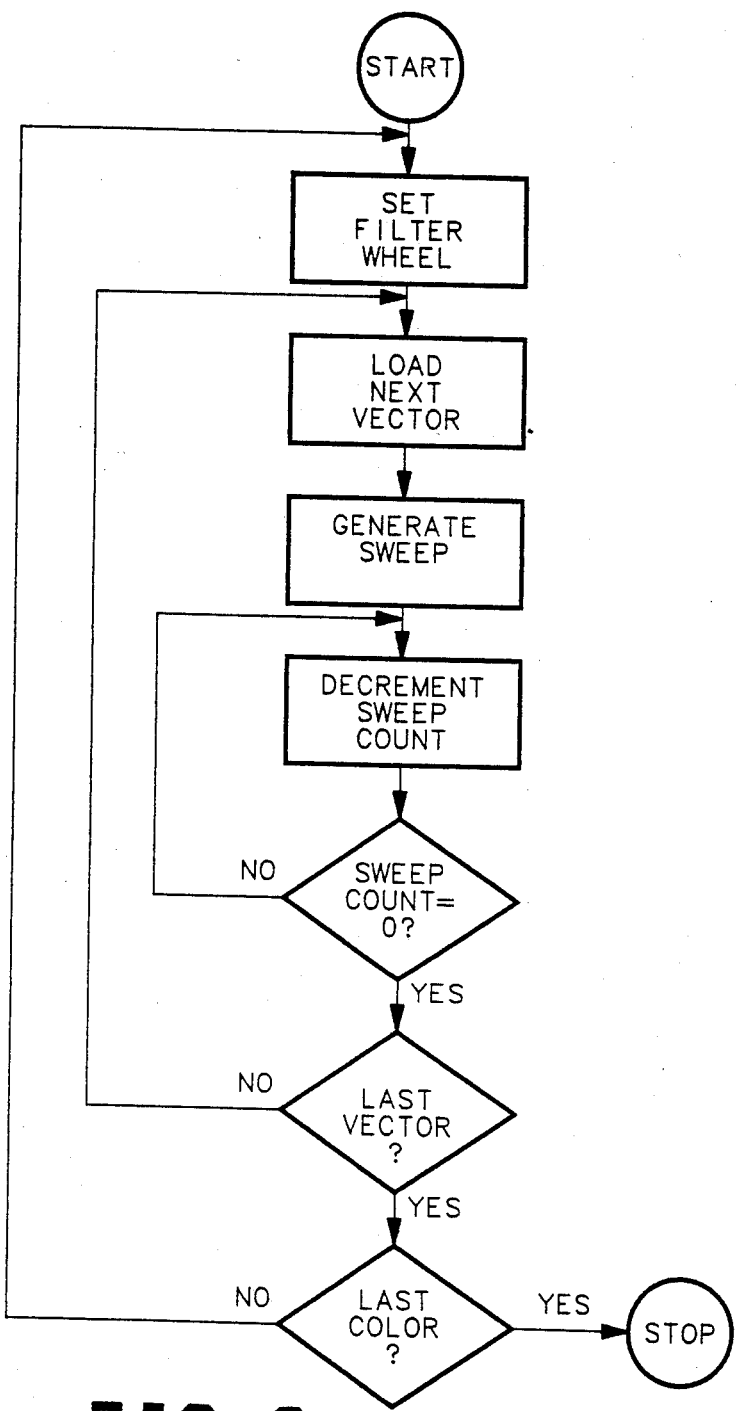
FIG. 3 shows a flowchart of a method of time modulation used in the preferred embodiment of the present invention.

FIG. 3 shows a flowchart of the method for time modulation for one buffer of vectors (assuming the entire set of vectors is too large to be contained in a memory to be accessed). For this flowchart, the host computer has already established the vectors, the colors, and the associated number of sweeps required for each primary color on the filter wheel to obtain the correct color. In block 10, the filter wheel is set to the appropriate color In block 20 in FIG. 3, the next vector to be produced by the CRT is loaded into the random-access memory (RAM) 20 shown in FIG. 2. This is actually just the endpoints. In block 30, a sweep is generated from one endpoint to the other endpoint, when the state machine 30 in FIG. 2 passes the vector endpoints from the RAM 20 to the digital stroker 40. This exposes the film to one sweep in a particular primary color. The sweep count, which is the number of sweeps required for this filter and vector, is decremented in block 40 of FIG. 3. In block 50, the sweep count is tested. If the sweep count is not zero, the film recorder returns to block 30 and generates another sweep. If the sweep count is zero, the film is sufficiently exposed to the current primary color for the current vector. The film recorder then tests for the final vector in this buffer at block 60. If this is not the final vector, the film recorder returns to block 20 and loads in the next vector. If this is the final vector in this buffer, the film recorder proceeds to block 70. The film recorder tests for the final primary color for this buffer. If the current primary color is not the last primary color in this buffer, then the film recorder returns to block 10 and sets the filter wheel to the next primary color. If this is the last primary color for this buffer, another buffer is filled with a subset of the vectors required to replicate the image. The process is repeated until the last subset of vectors is generated by the CRT. Then the film recorder stops with the image now fully recorded on the film. The film may then be rewound if it is slide film or regular photographic film, or removed if it is instant photographic film.

FIG. 2 shows a block diagram of the hardware used in the preferred embodiment of the current invention. The microprocessor 10 loads the next vector into the RAM 20 and the state machine 30 passes it to the digital stroker 40 when the sweep is to occur. The sweep counter 70 signals the state machine 30 when the last sweep for a particular color and vector occurs. The state machine 30 references the address counter 80 to determine the next address to be accessed in RAM 20.

The digital stroker 40, the digital-to-analog converters 50, 52, 54, and 56, and the analog stroker 60 convert the endpoints to analog voltages and generate all the necessary intermediate voltages to move the electron beam from one endpoint to the other. The hardware for generating the sweep was previously used in the Hewlett-Packard 1345A Graphics Display, and is discussed in HEWLETT-PACKARD JOURNAL, January 1982, p. 20, in an article entitled "A Fast, Compact High-Quality Digital Display for Instrumentation Applications", by Kunio Hasebe, William R. Mason, and Thomas J. Zamborelli.

We claim:

1. A method of recording an image from a cathode ray tube on photographic film using time modulation to control color in a vector film recorder comprising the steps of:

defining a set of available colors for the image to be recorded wherein each color definition is a set of three numbers such that there is one number for each filter of a color filter wheel which is interposed between the cathode ray tube and the photographic film of the vector film recorder and which is controllable as to filter, wherein the color filter wheel has filters in the primary colors (red, blue, and green), whereby an electron beam of a predetermined and constant intensity repeatedly swept from one point on the cathode ray tube to a second point on the cathode ray tube at a predetermined constant speed for each filter according to the color definition in the vector film recorder results in a recorded image of the sweep in the defined color, converting the image to be recorded into a set of vectors, each vector having a single color definition from the set of available colors, wherein each vector is spatially defined by a first point on the cathode ray tube and a second point on the cathode ray tube and consists of the line between and including the two points, such that the sum of all vectors comprises the image to be recorded, recording the image to be recorded by generating sweeps on the cathode ray tube and setting the color filter wheel according to each vector in the set of vectors and the corresponding color definition for each vector in the vector film recorder.

* * * * *